US012373403B2

(12) United States Patent
Alickaj et al.

(10) Patent No.: US 12,373,403 B2
(45) Date of Patent: Jul. 29, 2025

(54) SHARED CROSS-SESSION DICTIONARY USING DIRECT DATA ACCESS IN A DBMS

(71) Applicant: Oracle International Corporation, Redwood Shores, CA (US)

(72) Inventors: Altin Alickaj, Zurich (CH); Alexander Ulrich, Freiburg (DE); Eric Sedlar, Portola Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/113,707

(22) Filed: Feb. 24, 2023

(65) Prior Publication Data
US 2024/0289306 A1    Aug. 29, 2024

(51) Int. Cl.
*G06F 16/245*  (2019.01)
*G06F 16/21*   (2019.01)
*G06F 16/22*   (2019.01)
*G06F 16/23*   (2019.01)
(Continued)

(52) U.S. Cl.
CPC ........ *G06F 16/212* (2019.01); *G06F 16/2282* (2019.01); *G06F 16/2379* (2019.01); *G06F 16/245* (2019.01); *G06F 16/284* (2019.01)

(58) Field of Classification Search
None
See application file for complete search history.

(56) References Cited

U.S. PATENT DOCUMENTS

| 2013/0054649 | A1  | 2/2013 | Potapov et al. |
| 2016/0055191 | A1* | 2/2016 | Joshi ............... G06F 16/256 707/744 |
| 2017/0147664 | A1  | 5/2017 | Bussler |

(Continued)

FOREIGN PATENT DOCUMENTS

| CN | 104750809 A      | 7/2015 |
| WO | WO 2015/041967 A1 | 3/2015 |

OTHER PUBLICATIONS

Cristofer Zdepski; PDDM: A Database Design Method for Polyglot Persistence; American Scientific Research Journal for Engineering, Technology, and Sciences (ASRJETS); 2020; p. 136-152.*

(Continued)

*Primary Examiner* — Ann J Lo
*Assistant Examiner* — Jermaine A Mincey
(74) *Attorney, Agent, or Firm* — Hickman Becker Bingham Ledesma LLP; Brian Miller

(57) ABSTRACT

Herein, a guest language is a programming language that is not the native data access language (e.g. structured query language, SQL) of a database server. When instantiated in the database server, a guest language runtime environment provides any mechanisms needed to execute the guest language. In an embodiment contained entirely within the database server, multiple guest language runtime environments for same or different guest languages use respective database sessions to share a key-value store in RAM that stores rows from a persistent relational table. Consumption of computer resources such as time and memory space is decreased because the persistent relational table's operation by the key-value store does not generate a database statement, does not parse a database statement, does not query plan, and does not execute a database statement.

21 Claims, 5 Drawing Sheets

(51) Int. Cl.
*G06F 16/25* (2019.01)
*G06F 16/28* (2019.01)

(56) References Cited

U.S. PATENT DOCUMENTS

2018/0232459 A1* 8/2018 Park .................. G06F 16/2477
2021/0064619 A1 3/2021 Fender et al.

OTHER PUBLICATIONS

Pwint Khine; A Review of Polyglot Persistence in the Big DataWorld; 2016;MDPI; pp. 1-24.*
Wurthinger et al., "Practical Partial Evaluation for High-Performance Dynamic Language Runtimes", PLDI'17, Jun. 18-23, 2017, Barcelona, Spain, 15 pages.
Wanderman-Milne, Skye, "Building a Modern Database Using LLVM", dated Nov. 6, 2013, 27 pages.
Sipek M. et al., "Exploring Aspects of Polyglot High-Performance Virtual Machine GraalVM", dated 2019 42nd International Convention on Information Technology, dated May 20, 2019, pp. 1671-1676.
Marr, Stefan, "Tracing vs. Partial Evaluation", OOPSLA '15 Oct. 25-30, 2015, Pittsburgh, PA, USA, 20 pages.
Github, "Writing a Language in Truffle. Part 1: A Simple, Slow Interpreter", dated Oct. 13, 2014, 17 pages.
Yurenko, Alina 'Multilingual Engine: Executing JavaScript in Oracle Database', https://medium.com/graalvm/mle-executing-javascript-in-oracle-database-c545feb1a010, Jan. 28, 2021, accessed on Jan. 17, 2023, 12pgs.
Wurthinger, Thomas, et al., 'One VM to Rule Them All', 2013 ACM Intl symp on new ideas, new paradigms, and reflectns on programming and software, pp. 187-204, https://dl.acm.org/doi/10.1145/2509578.2509581, Oct. 29, 2013, 18pgs.
Rivenes, Andy, 'Memoptimized Rowstore—Fast Lookup', Oracle Database In-Memory, https://blogs.oracle.com/in-memory/post/memoptimized-rowstore-fast-lookup, Apr. 7, 2021, 9pgs.
Oracle Labs, 'TruffleString.FromNativePointerNode', (GraalVM Truffle Java API Reference), https://www.graalvm.org/truffle/javadoc/com/oracle/truffle/api/strings/TruffleString.FromNativePointerNode.html, accessed Jan. 22, 2023, 3pgs.
Oracle Labs, 'TruffleString. FromByteArrayNode', (GraalVM Truffle Java API Reference), https://www.graalvm.org/truffle/javadoc/com/oracle/truffle/api/strings/TruffleString.FromByteArrayNode.html, accessed Jan. 22, 2023, 4pgs.
Oracle Labs, 'Trufflestring.AsmanagedNode', (GraalVM Truffle Java API Reference), https://www.graalvm.org/truffle/javadoc/com/oracle/truffle/api/strings/TruffleString.AsManagedNode.html, accessed Jan. 24, 2023, 3pgs.
Oracle Labs, 'MLE Bindings for Oracle Database DBMS_MLE (mle-js-bindings)', https://oracle-samples.github.io/mle-modules/docs/mle-js-bindings/21c/, accessed Jan. 24, 2023, 2pgs.
Oracle Corporation, 'Oracle Database Multilingual Engine'. Https://labs.oracle.com/pls/apex/f?p=94065:12:32018698560791:1,. Accessed Jan. 7, 2023, 2pgs.
'Getting Started with Instruments in GraalVM', Jul. 26, 2022, https://www.graalvm.org/22.2/graalvm-as-a-platform/implement-instrument, printed on Mar. 9, 2023, 16pgs.
Diaconu, Cristian, et al., 'Hekaton: SQL Server's Memory-Optimized OLTP Engine', 2013 ACM SIGMOD International Conference on Management of Data, SIGMOD'13, https://doi.org/10.1145/2463676.2463710,, pp. 1243-1254, Jun. 22, 2013, 12pgs.
Briggs, Preston, et al., 'Rematerialization', PLDI '92: Proceedings of the ACM SIGPLAN 1992 conference on Programming language design and implementation, Jul. 1992 pp. 311-321, https://doi.org/10.1145/143095.143143, publ Jul. 1, 1992, 11pgs.

* cited by examiner

SHARED CROSS-SESSION DICTIONARY USING DIRECT DATA ACCESS IN A DBMS

FIELD OF THE INVENTION

The present invention relates to polyglot database acceleration. Without latency of executing database statements, a key-value store operates as a shareable memory cache of persistent relational data.

BACKGROUND

A stored procedure or a user-defined function (UDF) in a database management system (DBMS) may expose data stored in a database to an application program whose runtime is embedded in the DBMS. Embedding application logic in a DBMS facilitates intensive usage of data persisted in a database and eliminates network latency for client-server round trips. Concurrent application requests are usually mapped to a pool of database sessions. Each pooled session runs the same application logic. Database sessions are typically independent from each other and do not provide direct sharing of application programming language data structures. Each database session may run an independent instance of the application logic.

Application logic often relies on metadata that defines business rules and business objects. Because multiple instances of the application logic execute in independent database sessions, each of these instances needs to retrieve metadata and populate its own local cache. In this scenario, the cache cannot be shared across multiple application instances in a same database server. This makes the creation of application sessions expensive due to per-instance data retrieval, and increases memory consumption due to replication of cache for each instance of an application in a same database server.

Although a DBMS offers a mature and highly efficient infrastructure for centralized in-memory caching of data and for providing safe concurrent access with transactional semantics, this database infrastructure is not well integrated with data structures of general purpose programming languages. Application programs are restricted to single-instance data structures that account for multi-threaded access but cannot be shared with other instances, and offer only basic concurrency models if an application instance is multithreaded. This mismatch of concurrency without data sharing impedes both the programming model and efficiency of applications that are embedded in a DBMS to fully exploit the colocation of data and application logic.

Accommodating that impedance may increase consumption of computer resources such as time and space. Consumption of time and space may further be increased by evaluation of a structured query language (SQL) query by a state of the art relational DBMS (RDBMS) that entails multiple stages to generate an answer to the query. The SQL query may be in the form of a text string that must be passed to the SQL interface of the RDBMS. At a first execution of the query, the string may undergo parsing by the RDBMS, where the string is split into keywords, followed by type checking, where the query is analyzed for its semantic meaning. Only because of those steps, a query tree representing the semantics of the SQL query is generated by the RDBMS. The RDBMS also verifies authorization of the current user to execute the query. In addition, the query tree may undergo various query optimizations, which may be driven by cost estimation by the RDBMS. Actual query execution occurs only after those steps of parsing, analyzing, authorizing, planning, and optimizing that may be time and space intensive.

DETAILED DESCRIPTION

Figure 1:
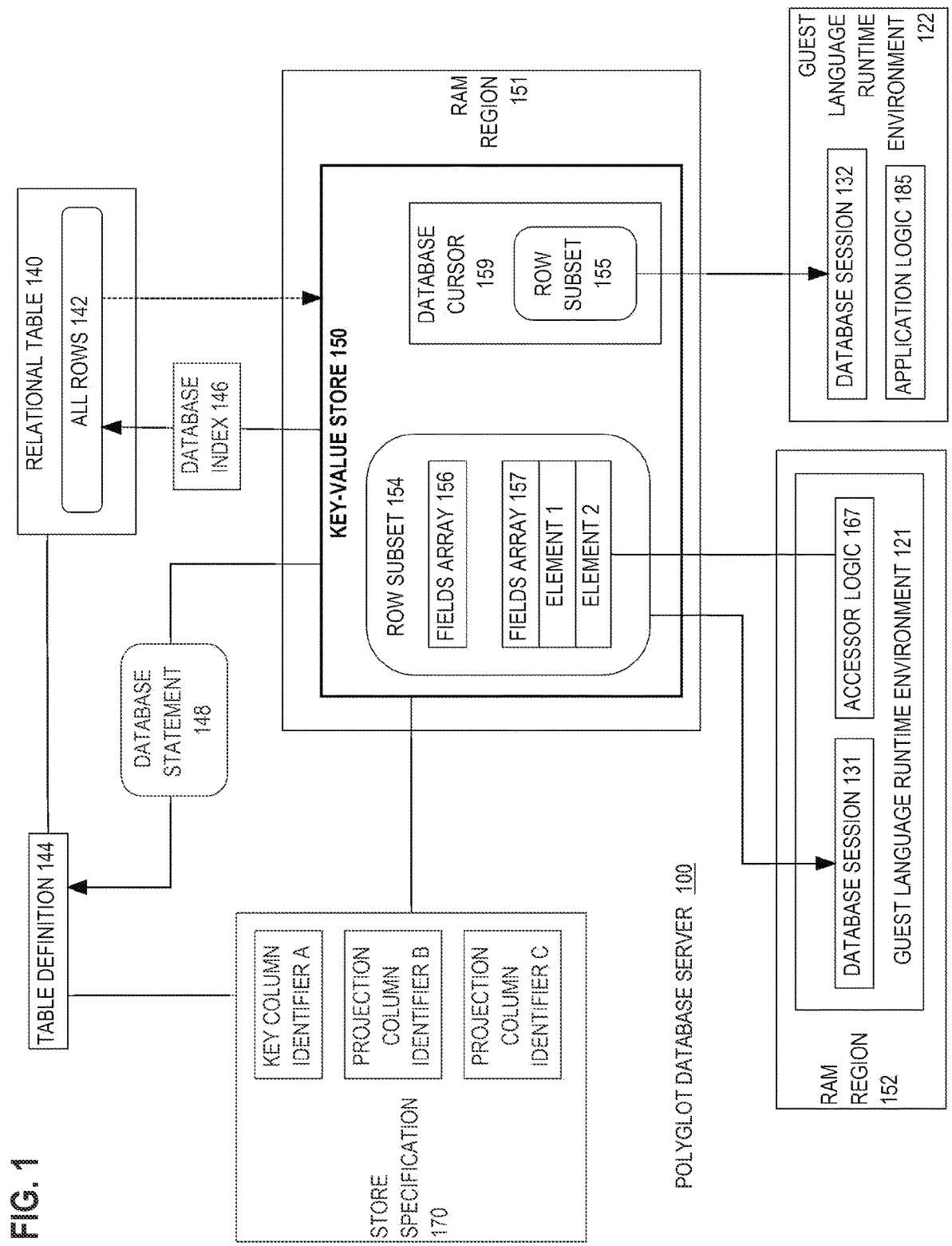
FIG. 1 is a block diagram that depicts an example polyglot database server that, without executing a database statement, operates a key-value store as a shareable cache in random access memory (RAM) for a persistent relational table.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present invention relates to polyglot database acceleration. Without latency of executing database statements, a key-value store operates as a shareable memory cache of persistent relational data. Embedding programming language runtimes into a relational database management system (RDBMS) facilitates running application logic directly in the RDBMS with maximum colocation of logic and persistent data. Applications embedded in databases may benefit from centralized data structures that are shared across multiple database sessions. For example, a database server may provide a respective distinct database session to each of multiple instances of an application that is embedded in the database server. The database server can maintain shared caches of data or application metadata without replicating content into each database session's private memory. Herein is a shared multi-session memory store that provides a key-value lookup interface for applications to use directly from whatever source language is the application programmed in. With acceleration provided by random access memory (RAM) and special analytic and generative techniques herein, this key-value store may be operated as a dictionary, a lookup table, or a cache. In an embodiment, the key-value store is implemented as a hash table.

For conservation of time and memory space, this key-value store does not execute database statements. All operation of a database by the key-value store uses internal database interfaces that do not involve relational algebra, even though those internal database interfaces may also be used in other ways that do not involve the key-value store, such as execution of structured query language (SQL) queries. Use of the internal database interfaces provides important features of an RDBMS to the key-value store and its users, including a concurrent programming model based on database transactions such as atomic consistent isolated durable (ACID). The key-value store uses RDBMS infrastructure of tables, shared-memory data caching, and transactional semantics to achieve memory sharing, persistence, and safe concurrent access. The key-value store is optimized for read-throughput. For individual lookups in constant time complexity, the key-value store may use an in-memory hash table as a caching-mechanism, allowing lookups over the key-value store to avoid disk accesses.

Although this novel key-value store accepts modifications to stored content, it is optimized for reading stored content. This key-value store aggressively attempts to contain all rows of a persistent relational table inside RAM and thus allows lookups of individual rows to be performed without any disk accesses. How much content is stored inside the key-value store can be controlled. Any retrieval key that exists in the key-value store is guaranteed to be up-to-date with the underlying ground truth that is persisted in the database. Reads can also be performed on a contiguous range of keys or a whole table scan, and novel techniques are presented for decreasing consumption of time and space by a row iterator.

Here is instrumentation for type conversions between application language datatypes and database datatypes. The key-value store initializes itself based on a user-configurable specification, including precomputing data structures which accelerate use of the key-value store. For example, the key-value store may generate specialized logic for datatype conversions. Because the schema and maximal size of values returned by a retrieval lookup are known in advance, such as for a later client after another client has already used the key-value store, the generated specialized logic may be retained and reused or regenerated as needed. Herein are various detections by semantic analysis of application logic to facilitate opportunistic avoidance of time and space intensive activities such as generation or execution of conversion logic for unneeded data and redundant copying of unneeded data.

Herein, a guest language is a programing language that is not the native data access language (e.g. SQL) of a database server. When instantiated in the database server, a guest language runtime environment provides any mechanisms needed to execute the guest language. In an embodiment contained entirely within the database server, multiple guest language runtime environments for same or different guest languages use respective database sessions to share a key-value store in RAM that stores rows from a persistent relational table. Consumption of computer resources such as time and memory space is decreased because the persistent relational table's operation by the key-value store does not generate a database statement, does not parse a database statement, does not query plan, and does not execute a database statement.

1.0 Example Polyglot Database Server

FIG. 1 is a block diagram that depicts an example polyglot database server 100, in an embodiment. For acceleration of logic in multiple guest language runtime environments 121-122 in polyglot database server 100, no database statements are executed to operate key-value store 150 as a shareable cache in random access memory (RAM) for persistent relational table 140. Polyglot database server 100 is a computer program that may be hosted by at least one computer such as a rack server such as a blade, a personal computer, a mainframe, a virtual computer, or other computing device. A relational database management system (RDBMS) may contain one or more instances of database server 100, each of which may contain and operate one or more relational databases.

1.1 Guest Language Runtime Environment

Polyglot database server 100 contains relational table 140 in a relational database and guest language runtime environments 121-122, each of which is an execution environment with execution infrastructure needed to execute application logic that is defined in a guest language that is not the native database language of polyglot database server 100. For example, structured query language (SQL) or other domain specific language (DSL) for data access may be the native database language of polyglot database server 100. A guest language may be a scripting language such as JavaScript or python or may be a general purpose programming language such as Java. Guest language runtime environments 121-122 provide all of the functionality required by a respective same or different guest language as follows.

The execution infrastructure of a guest language runtime environment may include standardized runtime libraries, a language virtual machine such as a Java virtual machine (JVM), source (i.e. text) logic tools, and/or bytecode tools. Source logic tools may include some or all of a parser, a compiler, or an interpreter, some of which are or are not specialized for a guest language. Bytecode is an intermediate representation (IR) for use as an instruction set architecture (ISA) of a language virtual machine that executes, by interpretation, each bytecode instruction individually in a bytecode sequence being executed.

Interpretation entails dynamically translating a source instruction (e.g. language statement) or bytecode instruction into a short sequence of a few machine instructions of an ISA of a central processing unit (CPU), and then the CPU executing the short sequence of machine instructions before interpretation of a next source or bytecode instruction. In an embodiment, a guest language runtime environment contains a source or bytecode interpreter that individually interprets source or bytecode instructions in guest logic that is defined in a guest language. For example, a script (i.e. guest logic) may be written in a guest language that is JavaScript, and the script is human-readable text that contains sequences of JavaScript statements. The script may reside in a file in a filesystem or may be computed (i.e. dynamically generated) by polyglot database server 100 or provided by a database client.

1.2 Retrieval of Database Content into Memory

Application logic 185 may be guest logic that uses key-value store 150 to access any of all rows 142 that are persisted in relational table 140. All rows 142 are all of the rows stored in relational table 140. Although guest language runtime environments 121-122 and polyglot database server 100 may operate in a same address space and a same operating system (OS) process, each of guest language runtime environments 121-122 and polyglot database server 100 may manage separate respective memory regions within that same address space. For example, random access memory (RAM) region 152 is managed by guest language runtime environment 121, and key-value store 150 is in RAM region 151 that instead is managed by polyglot database server 100. Guest language runtime environment 122 manages a RAM region (not shown) that is similar to RAM region 152.

Although memory regions 151-152 are managed by separate respective components, either of those components may, in some cases, access the memory region that is managed by the other component. For example, guest language runtime environments 121-122 and different guest logics 167 and 185 may access any rows from relational table 140 that reside in shared key-value store 150 in RAM region 151 that is managed by polyglot database server 100. That access into key-value store 150 provides accelerated execution of application logic 185 as follows.

1.3 Key-Value Store

Either of RAM regions 151-152 may reside in volatile or nonvolatile memory. In an embodiment, that memory is faster than a (e.g. persistent) bulk storage medium that is high capacity and used to persist (i.e. persistently store) relational table 140 in a storage medium that may be a same or slower RAM medium, a disk, or offloaded (i.e. remote) storage. Access by application logic 185 to any of all rows 142 is accelerated by key-value store 150. In database session 132, application logic 185 requests retrieval of row subset 155 that is a subset of all rows 142. For example, that retrieval request may specify range criteria that only matches row subset 155 that may contain one or more rows. If the retrieval request does not specify a range, then row subset 155 is all of all rows 142. If the retrieval request identifies a particular row, then row subset 155 contains only that particular row.

Likewise, guest logic (not shown) in guest language runtime environment 121 may use database session 131 to request retrieval of row subset 154 that is a subset of all rows 142 that may or may not contain some rows that row subset 155 also contains. The guest logic in guest language runtime environment 121 that requests retrieval of row subset 154 may or may not be the same as application logic 185 and, in any case, is not accessor logic 167 that instead is a field accessor as discussed later herein.

Key-value store 150 may or may not contain additional rows that are not in either of row subsets 154-155. For example, key-value store 150 may or may not contain all of all rows 142 and may or may not have sufficient capacity to store all of all rows 142 as discussed later herein. In any case, guest logic in both guest language runtime environments 121-122 may, after authorization discussed later herein, access any rows in key-value store 150 and may cause any of all rows 142 to be loaded into key-value store 150.

1.4 Store Specification

Store specification 170 is used to configure key-value store 150 during creation of key-value store 150. If there are multiple key-value stores, each has its own distinct store specification. Each store specification identifies a respective same or different relational table. Although no two store specifications are identical unless they represent a same key-value store, multiple store specifications may identify same relational table 140 so long as those store specifications each identify a respective distinct set of columns of relational table 140.

For example, relational table 140 may contain six columns A-F (not shown), and each column may have a distinct column identifier such as column number or a column name and, herein, those are identifiers A-F respectively for columns A-F. Store specification 170 contains column identifier A as a key column identifier to indicate that column A contains a unique row identifier that key-value store 150 should use and expose as a lookup key for identifying one of all rows 142. Store specification 170 contains column identifiers B-C as projection column identifiers to indicate that columns B-C contain field values that should be stored in key-value store 150 in RAM region 151. Store specification 170 does not identify remaining columns D-F that are never accessed by key-value store 150.

For example, each of all rows 142 may contain a respective record that has fields A-F (not shown) whose values are stored in columns A-F in relational table 140. Column A may contain cities, and application logic 185 may invoke key-value store 150 with a request that specifies Philadelphia as a lookup key for retrieving the values of fields B-C for Philadelphia. Same relational table 140 may also be exposed through other key-value stores whose store specifications may have a same or different key column, same or different projection columns, and same or different counts of projection columns, so long as each store specification has a distinct combination of projection columns and key column.

Materialization of projection row subsets 154-155 may be avoided, deferred, or decoupled from identification of which rows are in row subsets 154-155. In a materialized embodiment, row subsets 154-155 are materialized projections that are materialized in RAM. A materialized projection row, shown as fields array 157, actually contains elements 1-2 directly in key-value store 150.

In an unmaterialized embodiment, row subsets 154-155 are unmaterialized projections that are not materialized in RAM. An unmaterialized projection row, shown as same fields array 157, instead does not actually contain elements directly in key-value store 150. An unmaterialized projection row instead is a placeholder (e.g. a key of a row) that corresponds to a materialized row that resides in RAM region 151 but not in key-value store 150 itself. In other words, the materialized row is external to key-value store 150. Although the external materialized row is in RAM region 151, the external materialized row is not necessarily a projection. For example, the external materialized row may contain all columns in relational table 140. In the unmaterialized embodiment, loading a placeholder of a projection row into key-value store 150 may be referred to herein as loading the projection row into key-value store 150.

Depending on the embodiment, multiple key-value stores that use same relational table 140 do or do not share loaded rows in RAM region 151. The materialized embodiment does not share loaded rows, and multiple key-value stores, even if for same relational table 140, do not share content in RAM. For example, two different key-value stores may have slightly different projections of same all rows 142 and, even though those two projections mostly have identical values, separate copies of the identical values are stored in both key-value stores. Thus, key-value store 150 and its contents in RAM region 151 can be discarded without affecting other key-value stores that use same relational table 140.

The unmaterialized embodiment instead shares external materialized rows in RAM region 151, and the external materialized rows contain at least a union of all projection columns of all key-value stores that use same relational table 140 and may or may not contain other columns that are not projection columns. For example, row subsets 154-155 may contain identified but unmaterialized projection rows, and their contents may be contained in external materialized rows in RAM region 151 that contain all columns of relational table 140. Those external materialized rows are not owned by key-value store 150 but are instead shared by multiple key-value stores that use same relational table 140. Access of a field of an unmaterialized projection row may be implemented by accessing the same field in the corresponding materialized row. In that way, relational table 140 may have a row cache that multiple key-value stores can share to expose different projections of same external materialized rows that reside in the shared row cache in RAM region 151.

In that embodiment, the row cache mediates between key-value store 150 and relational table 140. In that case, access of relational table 140 by key-value store 150 may instead be implemented as access of the row cache by key-value store 150. In an embodiment, only the row cache directly accesses rows in all rows 142 in relational table 140.

In any case, the distinction between materialized and unmaterialized is a matter of interchangeable implementations. Because an implementation may be opaque, clients of key-value store 150 do not need to know whether the embodiment is materialized or not. Examples presented later herein may demonstratively involve materialization, and those same examples are readily implemented instead without materialization.

1.5 Store Initialization

The following is a signature of an example TypeScript function that accepts store specification 170 as input and returns a reference to key-value store 150 that the function will create if key-value store 150 does not already exist. For example, guest language runtime environments 121-122 may both invoke the following example TypeScript function for same key-value store 150, in which case the first invocation of the function creates and returns a reference to key-value store 150. The second invocation: a) in a demonstrative embodiment, merely returns a reference to same key-value store 150 or b) in an unmaterialized embodiment, creates a new instance of key-value store 150, and multiple instances of key-value store 150 are identically configured by may contain different projection row subsets and each instance may have a separate database cursor as discussed later herein.

initPdct (tableName: string, primaryKey: string, columnNames: string [ ]): IPdct;

Although invoking the function of the above signature causes authorization as discussed later herein, invoking methods (presented later herein) of the returned IPdct (i.e. key-value store 150) does not cause authorization. In an embodiment, the above signature is a method of, for example, database session 132 or of a database connection object, which is why a database session, as discussed later herein, is not needed as a parameter in the above signature. In any case, for guest language runtime environment 122, database session 132 should be initialized before invoking the above initPdct( ) function. All of the parameters in the above signature collectively are store specification 170, including the following parameter names that have the following meanings.

tableName identifies relational table 140.
  primaryKey is key column identifier A.
  columnNames contains projection column identifiers B-C.

1.6 Projection Rows

Timing of filling key-value store 150 with content is flexible. For example, key-value store 150 may or may not preload itself with projection rows from all of all rows 142 or as many of those projections as key-value store 150 has capacity for. Herein, a projection row is a row in a key-value store that corresponds to one of all rows 142 and that contains only projection columns identified by the store specification of the key-value store. Row subsets 154-155 are sets of projection rows. Each of all rows 142 may correspond to respective zero or one projection row in each key-value store that uses relational table 140.

Key-value store 150 answers a retrieval request by providing references (e.g. memory address pointers) of projection rows. For example, key-value store 150 may return, to application logic 185, references to the individual projection rows in row subset 155 and, as discussed later herein, those references may be returned one at a time by an iterator. In the shown embodiment, each projection row is implemented as a respective fields array that has a respective array element for each projection column. For example as shown, fields array 157 contains elements 1-2 that respectively store values projected from columns B-C of relational table 140.

1.7 Datatype Conversion

Although elements 1-2 (and columns B-C) may each have a respective database datatype such as text or number, the guest language of guest language runtime environment 121 might be JavaScript that is not strongly typed. Furthermore, the type systems of key-value store 150 and guest language runtime environments 121 may be different and need type conversion of values. For example, the database datatype of element 2 may need a special transformation to conform to a datatype that guest language runtime environment 121 supports.

As discussed later herein, guest language runtime environment 121 has a novel logic generator that dynamically generates accessor logic 167 as a field accessor for column C (i.e. element 2) that is specialized to convert a particular database datatype to a particular guest datatype. Each projection column may have its own type-specific field accessor, and projection columns having a same database datatype do or do not share a field accessor. Type-specific field accessors may be specializations of a generalized field accessor, and guest logic may use type-specific field accessor logic 167, as if it were a generalized field accessor.

For example, the generalized field accessor may have slow and bulky logic that can perform a transformation to and from any datatype, and accessor logic 167 may be an accelerated replacement of the generalized field accessor, but only for use with the datatype of column C (i.e. element 2). The guest logic may be unaware of whether or not the generalized field accessor has been replaced with accessor logic 167 for element 2 and, because of the generalized field accessor as a default, application logic 185 may, although decelerated, correctly operate even if type-specific field accessor logic does not yet or will not exist for column C.

1.8 Cache Operation

Application logic 185 may request retrieval of a row subset for which key-value store 150 contains some, but not all, requested projection rows. For example, key-value store 150 may return an iterator (not shown) to application logic 185 that may get a next row from the iterator in each iteration of a loop in application logic 185. If the iterator is invoked by application logic 185 to return a next projection row that is already in key-value store 150, a hit occurs, and the iterator returns a reference to the projection row in key-value store 150. Even without an iterator, a hit may occur if an individually requested key matches (i.e. corresponds to) a projection row that is already in key-value store 150.

If a hit does not occur for the iterator or individual retrieval, then a miss occurs, which means that key-value store 150 does not yet store the requested projection row. In that case, key-value store 150: a) retrieves the field values of the missing projection row from the projection columns of a corresponding one of all rows 142 in relational table 140, b) generates a projection row based on the retrieved field values, c) stores the projection row in key-value store 150, including possibly evicting a different (e.g. unneeded for remaining iterations of an iterator) projection row from key-value store 150, and d) returns a reference to the projection row to application logic 185.

A miss that logically requires retrieval of one row from relational table 140 may instead, for acceleration, retrieve multiple or all of all rows 142. For example, loading one row from relational table 140 may entail loading a disk block that contains that row and also contains some other rows that key-value store 150 may opportunistically load too. In one example, an iterator prefetches rows from relational table 140 into key-value store 150 in batches. In another example, lookup by application logic 185 with an individual key causes multiple or all of all rows 142 to be loaded from relational table 140 into key-value store 150 even though only one row was requested.

Loading of key-value store 150 is novel and based on direct integration with database mechanisms and database components in the database that contains relational table 140. Novel loading of key-value store 150 does not entail executing a database statement, such as a structured query language (SQL) statement, such as a data query language (DQL) query or a data manipulation language (DML) statement. Key-value store 150 selects and retrieves rows from relational table 140 without executing a database statement, as shown by the dashed arrow that indicates retrieval of some or all of all rows 142 into key-value store 150, which is accomplished in three different ways for three different scenarios as follows.

In a first scenario, a miss occurs (e.g. while using an iterator or not) and one particular row needs loading from relational table 140. In that scenario, key-value store 150 directly uses database index 146 to identify the row to load from relational table 140 and loads a projection of that identified row into key-value store 150 using an interface of relational table 140 that can retrieve an identified row. Database index 146 indexes, as unique, all rows 142 by key column A as specified in store specification 170. Uniqueness required for indexing herein means that a key column cannot contain duplicate values.

A key column is a column role designated in a store specification, which does not necessarily correspond to a primary key of relational table 140 that may use a different column or multiple columns. For example, store specification 170 designates column A as a key column for key-value store 150, but another key-value store for same relational table 140 may instead use column B as a key column. Thus, whether or not column A is a key column depends on which key-value store is used. For example, application logic 185 may use multiple key-value stores for same or different relational tables.

1.9 Rows Iteration

In a second scenario that entails a full scan of relational table 140, application logic 185 uses an unbounded (i.e. not range bounded as discussed below) iterator to retrieve all rows 142 even though none of rows 142 are stored in key-value store 150. In that scenario, no database filtration is needed because all of all rows 142 should be retrieved. In that case, database index 146 is not used and, instead, an interface of relational table 140 that can retrieve all rows is directly used to load key-value store 150.

In a third scenario, a range iterator is used to iterate a range of logically adjacent rows of all rows 142. Logical adjacency is not physical adjacency on disk. Logical adjacency is two rows whose key column values are adjacent, such as two adjacent serial numbers. A retrieval request by application logic 185 may specify a range of keys of rows to retrieve, and key-value store 150 may return a range iterator that iteratively returns projections of every row in that key range.

The following is a TypeScript interface of an example range iterator that has a next( ) method that application logic 185 may invoke (e.g. in each iteration of a loop). Invoking all of the methods in the following TypeScript interface does not cause generating a database statement, parsing a database statement, query planning, nor executing a database statement.

```
export interface PdctRangeCursor {
    hasNext( ): boolean;
    next( ): any;
    close( ):boolean;
}
```

Although a retrieval request by application logic 185 does not specify some gaps within a range, nonetheless some gaps actually may exist in all rows 142. Requesting a next projection row causes a range iterator to skip any gap of non-existent rows in relational table 142. For example, if the datatype of key column A is integer and column A contains only even numbers, then a request by application logic 185 to retrieve all rows whose column A value is in a range, between one and ten, will generate a range iterator that skips non-existent rows identified by odd numbers in that range.

For each iteration of any (i.e. range or full scan) iterator, key-value store 150 uses database index 146 to identify a next key column value of a next row in all rows 142, which database index 146 does even if that entails skipping a gap in the key space. That is, database index 146 itself reflects any gaps in all rows 142. Thus for each iteration of any iterator, key-value store 150 performs in the following order: a) get the next existing key from database index 146, b) if a hit occurs because key-value store 150 already contains a projection row for the next existing key, then return a reference to that projection row to application logic 185, and c) if a miss occurs because key-value store 150 does not already contain a projection row for the next existing key, use the next existing key to load a next row (and possibly additional rows) from relational table 140 into key-value store 150 and then return a reference to that projection row to application logic 185.

1.10 Store Interface

The following is a TypeScript interface of an example key-value store 150 that application logic 185 may invoke repeatedly and in various ways. Included in this TypeScript interface is a create (i.e. insert) read (i.e. get) update delete (CRUD) interface. Also included in this TypeScript interface is methods for a full table scan and a range bounded scan.

```
export interface IPdct {
    get(key: any): any;
    insert(key: any, values:any[ ]): boolean;
    update(key: any, values: any[ ]): boolean;
    delete(key: any): boolean;
    close( ): number;
    scan( ): IPdctRangeCursor;
    range(startKey: any, endKey: any): IPdctRangeCursor;
}
```

Despite richness of the above TypeScript interface that includes a CRUD interface, invoking all of the methods in the above TypeScript interface does not cause generating a database statement, parsing a database statement, query planning, nor executing a database statement. In the above TypeScript interface, the following names have the following meanings.

>key is a value that is or can be stored in key column A of relational table 140.
>
>values is the guest language equivalent of, for example, fields array 157 that contains a separate value (i.e. element) for each of projection columns B-C.

Two store specifications may identify a same key column, in which case two key-value stores may share database index 146. Two key-value stores that do not use a same key column should have separate respective database indices on separate respective key columns in same or different respective relational tables.

1.11 Authorization

Although key-value store 150 is shared by guest language runtime environments 121-122, key-value store 150 is not owned by either of guest language runtime environments 121-122, and key-value store 150 does not itself use either of database sessions 131-132 to access database index 146 and relational table 140. In other words, the integration of key-value store 150 with database index 146 and relational table 140 is not based on a security profile of either of database sessions 131-132. In that case, key-value store 150 has the following novel way of authorizing database session 132 to use key-value store 150.

Authorization of database session 132 by key-value store 150 requires use of database session 132. For example to obtain a reference to key-value store 150 itself, application logic 185 may be required to provide an identifier or reference of database session 132 that key-value store 150 can use for authorization processing. If authorization database statement 148 does not yet exist for key-value store 150, then key-value store 150 dynamically generates database statement 148 for database session 132 and can retain database statement 148 for future authorization of other database sessions.

Formulation of database statement 148 depends on what granularity does polyglot database server 100 provide authorization. If polyglot database server 100 only authorizes use of relational table 140 as a whole, then database statement 148 need only specify accessing relational table 140. If polyglot database server 100 instead authorizes use of individual columns, then database statement 148 should specify accessing the key column and all projection columns that are identified in store specification 170.

However, database statement 148 is not executed. For example, polyglot database server 100 may, in database session 132, parse database statement 148 into a parse tree that polyglot database server 100 uses to identify which table(s) and column(s) does database statement 148 access in what ways. For example, an authorization subsystem of polyglot database server 100 may authorize based on the parse tree or based on a set of identifiers of tables and column accessed in the parse tree. If key-value store 150 supports retrieval only, then database statement 148 should not specify any updating, deleting, nor inserting.

If key-value store 150 supports updating, deleting, or inserting by guest logic that uses key-value store 150, then database statement 148 should specify updating, deleting, or inserting to verify sufficient privilege for database session 132. In other words, authorization of database statement 148 by a query engine of polyglot database server 100 reveals, without actually executing database statement 148, whether or not database session 132 can or cannot use key-value store 150. In an embodiment, authorization of database statement 148 by a query engine of polyglot database server 100 does not entail query planning.

Authorization of database statement 148 by the query engine of polyglot database server 100 may entail inspection of table definition 144 that is metadata that defines relational table 140, and table definition 144 may or may not be stored in the database that contains relational table 140. For example, that database may contain a relational schema that contains table definition 144 and a definition of database index 146. Authorization of database statement 148 by the query engine of polyglot database server 100 may be based on previously executed data control language (DCL) statements such as GRANT in SQL.

1.12 Database Cursor

Similar to retrievals, writes (i.e. insert, update, or delete) by application logic 185 to key-value store 150 are persisted to relational table 140, without executing a database statement, by key-value store 150 directly using a write interface of relational table 140, and that interface causes maintenance of database index 146. For example if key-value store 150 deletes a row in relational table 140, then that row's key is removed from database index 146.

Even though retrieval from key-value store 150 by application logic 185 never entails execution of a database statement, key-value store 150 may nonetheless use database cursor 159 that is allocated by polyglot database server 100 to a database session (not shown) that is owned by key-value store 150 and that is none of database sessions 131-132. Database cursor 159 is a native database cursor that can provide all of its functionality to key-value store 150, whether for iteration of multiple rows or for individual lookup of one row. For example for iteration of retrieved rows, key-value store 150 may provide to application logic 185 a reference to an iterator that is tightly coupled to database cursor 159, and key-value store 150 may operate database cursor 159 when the iterator is operated by application logic 185. Special use of database cursor 159 is discussed later herein.

In an embodiment, key-value store 150 has only one database cursor, which is used to concurrently serve all guest logic in all guest language runtime environments 121-122. In an embodiment, key-value store 150 has a separate respective database cursor for each guest logic that uses key-value store 150. For example, there may be a one-to-one correspondence of database cursors in key-value store 150 to database sessions in guest language runtime environments 121-122. For example, each of database sessions 131-132 may or may not correspond to a respective database cursor in key-value store 150, depending on the embodiment. Thus, whether database cursor 159 concurrently supports only one row subset 155 or multiple row subsets 154-155 depends on the implementation. In any case, database sessions 131-132 are not used by key-value store 150 except for authorization as discussed earlier herein.

2.0 Example Key-Value Storage Process

Figure 2:
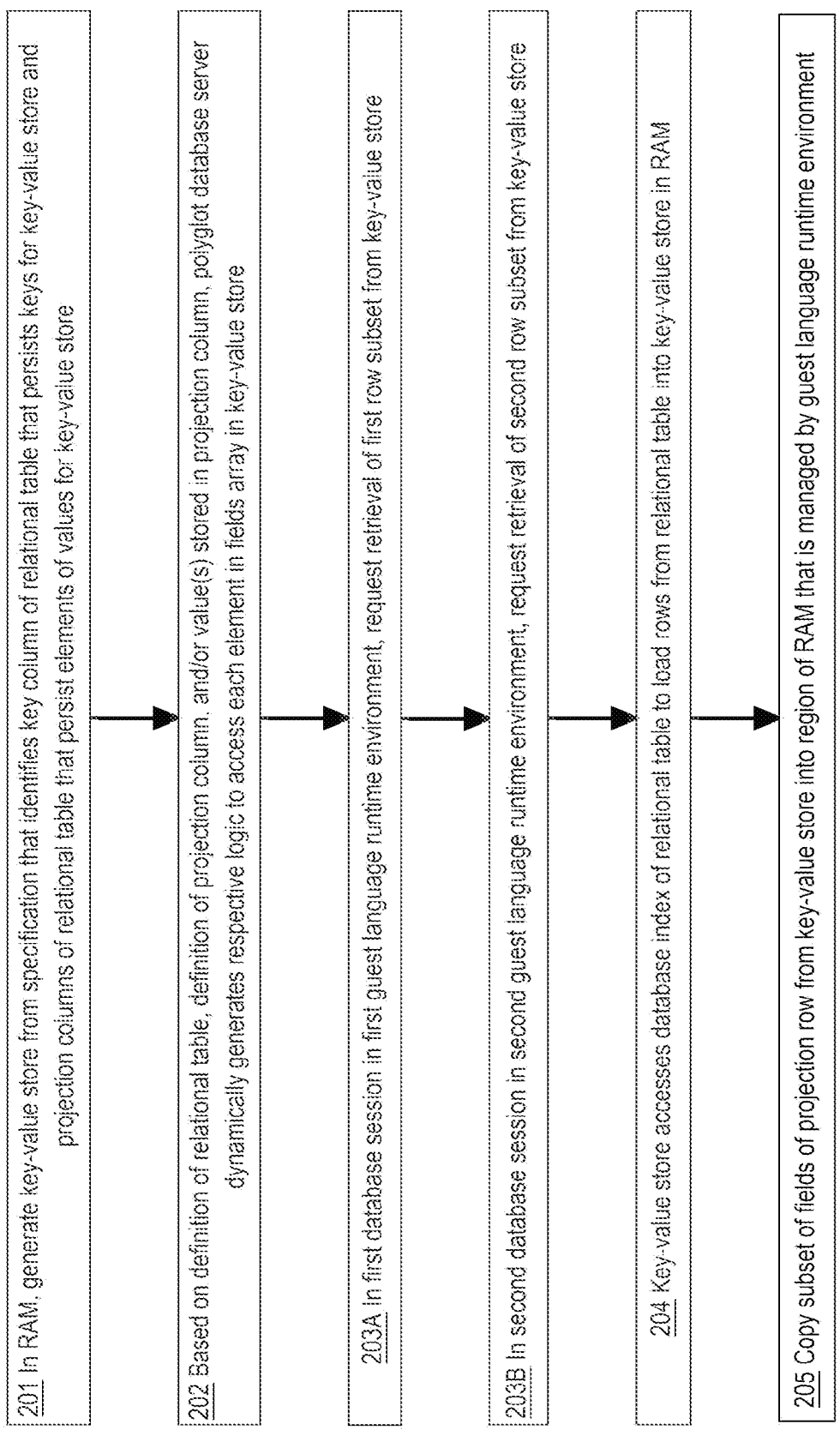
FIG. 2 is a flow diagram that depicts an example computer process that operates a key-value store as a shareable cache in RAM for a persistent relational table without executing a database statement.

FIG. 2 is a flow diagram that depicts an example computer process performed by polyglot database server 100. For acceleration of application logic in multiple guest language runtime environments 121-122, the process of FIG. 2 executes no database statements while operating key-value store 150 in RAM region 151 as a shareable cache for persistent relational table 140, in an embodiment. FIG. 2 is discussed with reference to FIG. 1.

In an embodiment, step 201 is caused by a first invocation of the initPdct( ) function for distinct store specification 170 as discussed earlier herein and, in that case, it is the initPdct( ) function that performs step 201. As discussed earlier herein, subsequent invocations of initPdct( ) with same store specification 170 do perform configuration step 201 or do not perform step 201 and instead return a reference to existing key-value store 150. For example, application logic 185 and same or different application logic in guest language runtime environment 121 may independently invoke initPdct( ).

In RAM region 151, step 201 generates key-value store 150 from store specification 170 that identifies: a) key column A of relational table 140 that persists keys for key-value store 150 and b) projection columns B-C of relational table 140 that persist elements of values for key-value store 150. For example after step 201, key-value store 150 may later contain field array 157 that may be a projection row that contains elements 1-2 that respectively are stored in projection columns B-C. Whether or not step 201 also preloads key-value store 150 with some or all of all rows 142 depends on the implementation. For example, key-value store 150 may or may not be empty when step 201 finishes.

In an embodiment, step 202 is caused when the initPdct( ) function is first and subsequently invoked, and it is the initPdct( ) function that performs step 202. For example, application logic 185 may be a stored procedure invoked by a database statement from a client or invoked by a database trigger.

Step 202 may generate a field accessor for application logic 185 to use to access a projection column, and that generation may be based on any or all of: table definition 144, definition of projection columns B-C in table definition 144, and/or value(s) stored in that projection column. All application logics in a same guest language runtime environment use a same field accessor to access a same projection column in same key-value store 150. Separate although identical field accessors for a same projection column may be redundantly generated by different key-value stores used in same guest language runtime environment 122 for same relational table 140. For same key-value store 150, two guest language runtime environments 121-122 should not share field accessors.

In one example, table definition 144 contains a definition of projection column B that forbids null values, e.g. per a SQL NOT NULL clause. In that case, step 202 generates a field getter (i.e. an accessor for reading, not writing) that is accelerated by not detecting and handling a null value because a null value will never be read from projection column B.

An example of a generated specialized field accessor is accessor logic 167 and, although not shown, logics 167 and 185 may reside together in a same guest language runtime environment. In that case and as discussed earlier herein, application logic 185 invokes accessor logic 167 as if accessor logic 167 were a generalized field accessor, even though accessor logic 167 instead is a specialized field accessor.

For example, step 202 may rewrite a parse tree of application logic 185 to replace an invocation of a generalized field accessor with instead an invocation of specialized accessor logic 167. Generalized static and dynamic rewriting techniques for a (e.g. Truffle) parse tree that may represent application logic 185 are presented in version 22.2 of "Getting Started with Instruments in GraalVM" that is incorporated herein in its entirety as published by Oracle on Jul. 26, 2022 and available at https://www.graalvm.org/22.2/graalvm-as-a-platform/implement-instrument. Rewriting techniques of the present invention are novel as specialized herein.

Dynamic generation of accessor logic 167 may be based on values of projection fields previously observed by, or currently in, key-value store 150. For example, table definition 144 may define projection column B as able to store null values, which does not mean that column B actually does contain a null value. If key-value store 150 detects that column B currently contains no null values, or if key-value store has observed a substantial subset of all rows 142 but never observed a null value in column B, step 202 may optimistically speculate that a null value will not in the future be retrieved from column B in relational table 140. In that case, dynamic generation of accessor logic 167 may entail dynamic generation of a parse tree for accessor logic 167 that contains a deoptimization point that only executes if a null value is retrieved from column B in relational table 140.

In that case, execution of the deoptimization point causes dynamic rewriting of the parse tree of accessor logic 167 to replace the deoptimization point with additional logic that accommodates a null value and that executes by guest language runtime environment 121's interpretation, one by one, of parse tree nodes of the additional logic that accommodates the null value. For example, a guest language might not support a null value and instead need a null value to be converted into an empty string or a zero. In an embodiment, generating or rewriting a parse tree for accessor logic 167 does not entail generating source code (e.g. JavaScript). Instead, new nodes may be directly inserted into the parse tree to provide additional logic. In an embodiment, parse trees have a universal format that does not depend on which guest language or which guest language runtime environment generated a parse tree. For example, a parse tree of logic 167 or 185 may be rewritten in a generalized way that requires no knowledge of what guest language and guest language runtime environment are involved.

Steps 203A-B are demonstratively symmetric in that they perform demonstratively similar activities for separate respective guest language runtime environments 121-122. However there is no requirement for symmetric behavior by different guest language runtime environments. One intent of FIG. 2 is to demonstrate that key-value store 150 can be (e.g. in parallel or in serial) shared by multiple guest language runtime environments 121-122. Thus, it does not matter in what order do steps 203A-B occur. For example, performance of steps 203A-B may or may not overlap. Likewise, FIG. 2 may designate a first and second of some component of FIG. 1, and it does not matter which component is first or second. For example, it does not matter if a first database session is database session 131 or database session 132 so long as the designation is consistent with techniques presented herein. For example, if a first database session is database session 132, then a first guest language runtime environment should be guest language runtime environment 122 that contains database session 132.

In a first database session in a first guest language runtime environment, step 203A requests retrieval of a first row subset from key-value store 150. Likewise, in a second database session in a second guest language runtime environment, step 203B requests retrieval of a second row subset from key-value store 150. Typically, steps 203A-B are performed by separate execution threads, for example on separate cores of a CPU. In various embodiments, key-value store 150 is or is not fair, which means that the retrieval requests of steps 203A-B are or are not answered by key-value store 150 in the same ordering as those requests occur.

In this example, key-value store 150 is either empty or at least missing some of all rows 142, and either or both of steps 203A-B require loading some or all of all rows 142 into key-value store 150 from relational table 140 by step 204. In step 204, key-value store 150 accesses database index 146 to load one, some, or all rows from relational table 140 into key-value store 150 in RAM region 151. None of the steps of FIG. 2, including step 204, execute a database statement.

Regardless of miss (i.e. loading step 204) or hit in key-value store 150 or any combination of hits and misses, key-value store 150 provides novel acceleration for generating answers to the retrieval requests of steps 203A-B. That acceleration is provided by steps 203A-B and 204 not generating a database statement, not parsing a database statement, not query planning, and not executing a database statement, even though step 204 actually does load rows from relational table 140 into key-value store 150.

Step 204 is shown as a single loading step, however steps 203A-B may in some examples occur in ways that cause step 204 to be invoked twice, which is once to generate an answer for the retrieval request of step 203A and once to generate an answer for the retrieval request of step 203B. Additional acceleration may be achieved if answers to both retrieval requests are generated based on a single performance of step 204.

Step 204 is a loading step. Step 204 detects whether or not key-value store 150 already contains all requested rows by inspecting database index 146 to confirm that neither of steps 203A-B will cause a miss. If step 204 detects that no misses will occur, then step 204 does not access relational table 140. In an unmaterialized embodiment as discussed earlier herein, loading step 204 may load from a row cache of external unmaterialized rows instead of loading directly from relational table 140. In that case, step 204 may or may not also entail loading rows from relational table 140 into the row cache.

Step 205 occurs for each guest language runtime environment that uses key-value store 150 including, in this example, guest language runtime environment 121 that manages RAM region 152. Step 205 lazily extracts, transforms, and copies only the needed subset of fields (i.e. projection columns) of a projection row from key-value store 150 into RAM region 152 that is managed by guest language runtime environment 121.

It is the field accessors that perform step 205 when each field accessor is first invoked for each projection row. Step 205 occurs at different times for different fields and/or different projection rows according to when application logic in guest language runtime environment 121 uses which field accessors. Subsequent invocations of a same field accessor on a same projection row do not access the projection row in key-value store 150 and instead access the already-transformed copy in RAM region 152. Because repeated transformations of a same field value (e.g. element 1) is avoided, step 205 accelerates the application logic in guest language runtime environment 121.

3.0 Example Key-Value Storage Activities

Figure 3:
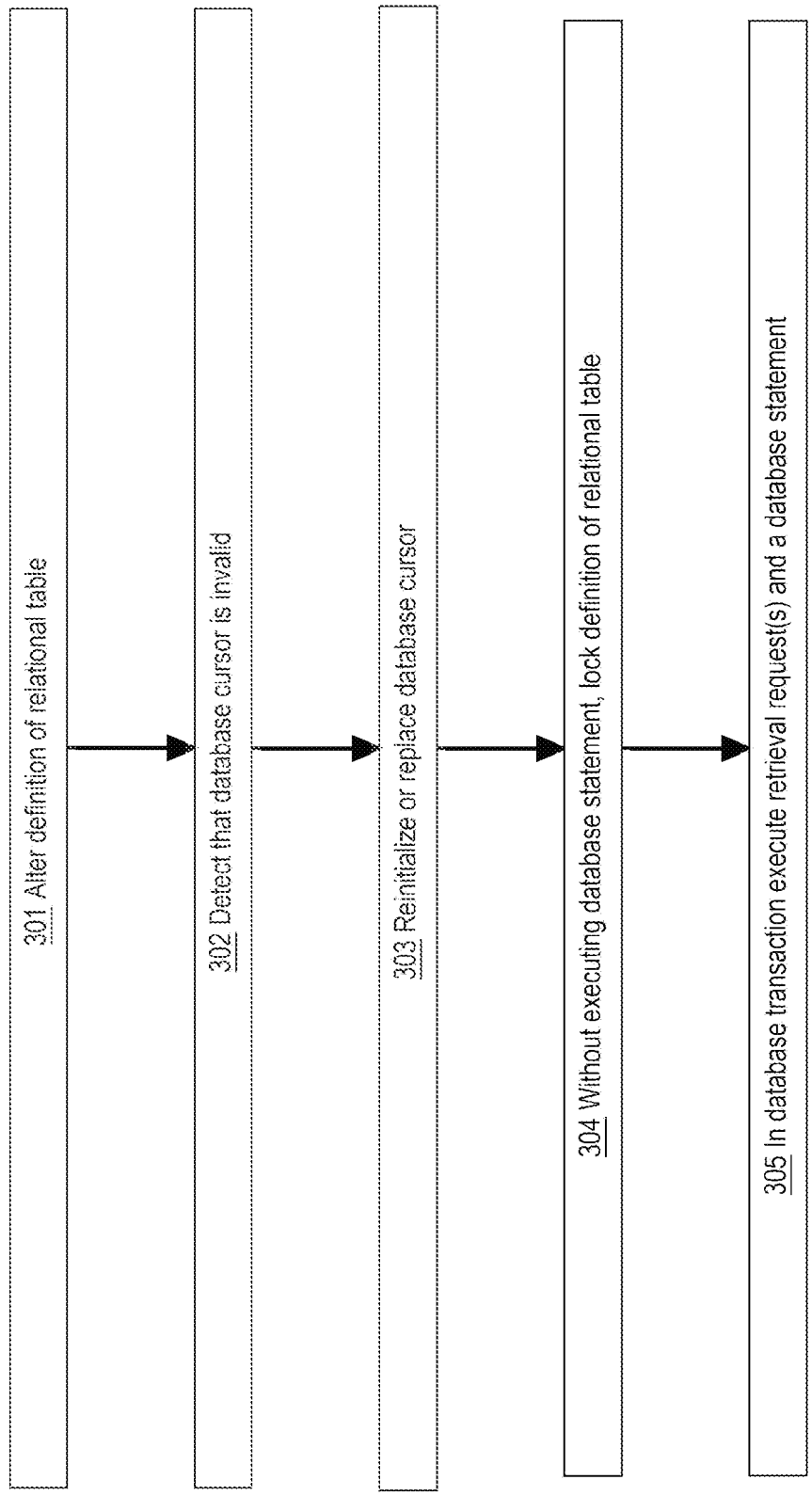
FIG. 3 is a flow diagram that depicts an example computer process that operates a key-value store as a shareable cache in RAM for a persistent relational table without executing a database statement.

FIG. 3 is a flow diagram that depicts an example computer process performed by polyglot database server 100. For acceleration of logic in multiple guest language runtime environments 121-122, the process of FIG. 3 executes no database statements while operating key-value store 150 in RAM region 151 as a shareable cache for persistent relational table 140, in an embodiment. The steps of the processes of FIGS. 2-3 are complementary and may be combined or interleaved. FIG. 3 is discussed with reference to FIG. 1.

In this example, application logic 185 is a stored procedure that repeatedly invokes key-value store 150 in same or different ways and has already done so in the current execution of application logic 185 that is still ongoing before and during the entire process of FIG. 2. Thus, application logic 185 already has a reference to key-value store 150 that already contains some projection rows that were returned to application logic 185. In that case, key-value store 150 already used database cursor 159 that is retained for future use for application logic 185.

Step 301 is unfortunate and disruptive. In step 301, another database user alters table definition 144 of relational table 140 that key-value store 150 is already using.

Upon a next use of key-value store 150 by either of guest language runtime environments 121-122 in step 302, key-value store 150 detects that database cursor 159 is invalid due to alteration of table definition 144 after initialization of database cursor 159. In an embodiment, database cursor 159 itself may indicate invalidity to key-value store 150. In an embodiment, either key-value store 150 or database cursor 159 contains a version identifier (e.g. serial number or timestamp) of table definition 144 when database cursor 159 is initialized, and key-value store 150 can, when later needing database cursor 159 again, verify that a current version of table definition 144 still matches the earlier recorded version. In an embodiment, key-value store 150 instead subscribes to publication of changes of table definition 144.

In response to detecting that table definition 144 changed, key-value store 150 should discard all of its projected rows to become empty, unless key-value store 150 can determine that the change to table definition 144 does not impact key-value store 150. Depending on the embodiment, addition of a new column to relational table 140, as specified by the change to the table definition 144, can or cannot always be ignored by key-value store 150. Whereas removal of a column from relational table 140 can be ignored only if the removed column is not identified in store specification 170. Any change to table definition 144 that cannot be ignored should cause key-value store 150 to become empty and invalidate all database cursors of key-value store 150. In an embodiment, no change table definition 144 can be ignored In any case, step 302 is caused by a next use of key-value store 150 by either of guest language runtime environments 121-122, and step 302 can detect that database cursor 159 is invalid immediately before a next use of database cursor 159 by key-value store 150. That detection of invalidity causes key-value store 150, in step 303, to reinitialize or replace database cursor 159, which may entail invoking an interface of database cursor 159, of relational table 140, or of polyglot database server 100.

In various embodiments and scenarios that do not involve table definition 144, key-value store 150 should invalidate some but not all projection rows as follows. If relational table 140 is immutable (i.e. read only), then key-value store 150 might evict a row due to lack of capacity but will never invalidate a row unless table definition 144 is altered. If relational table 140 is accessed only by key-value store 150, then key-value store 150 operates as a write-through (i.e. not a write-back) cache that might evict a row due to lack of capacity but will never invalidate a row unless table definition 144 is altered.

In an embodiment, relational table 140 can be configured so that only key-value store 150 can access relational table 140. The only occasion in which key-value store 150 should invalidate a projection row, despite table definition 144 being unaltered, is when the projection row's corresponding row in all rows 142 is updated or deleted not by key-value store 150, which an embodiment may be configured to forbid.

Whether step 303 is skipped because step 302 did not detect invalidity, or whether step 303 reinitialized or replaced database cursor 159, in either case, database cursor 159 is a valid database cursor when step 304 starts. Without executing a database statement, step 304 directly invokes an interface of table definition 144 to lock table definition 144, which is not the same as locking relational table 140 itself. Key-value store 150 never alters table definition 144. Thus while table definition 144 is locked by key-value store 150, table definition 144 cannot be altered until later unlocked.

So long as table definition 144 is locked by key-value store 150, key-value store 150 can use database cursor 159 without re-verifying that database cursor 159 remains valid. Steps 302-304 may occur within a database transaction. That is, any retrieval request to key-value store 150 during same or different invocations of application logic 185 may independently occur in its own database transaction or may occur in a same database transaction with other retrieval requests by application logic 185. For example, step 305 executes one or more retrieval requests by one or more application logics and one or more database statements (e.g. application logic 185 may use SQL to access other relational tables) in a same database transaction.

In other words, all of the atomic consistent isolated durable (ACID) guarantees and all of the database isolation levels (e.g. repeatable reads) provided by polyglot database server 100 also apply to key-value store 150. For example until a database transaction of database session 132 is committed, key-value store 150 may contain: a) a projection row that is accessible only in database session 132 that used key-value store 150 to insert the uncommitted row or b) an uncommitted deleted projection row that other database session 131 can still access until committed, but that database session 132 can no longer access without transaction rollback. Key-value store 150 may contain different project rows for a same row in relational table 140, such as a modified projection row for an uncommitted transaction and an unmodified projection row for concurrent use outside of that transaction.

4.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

4.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
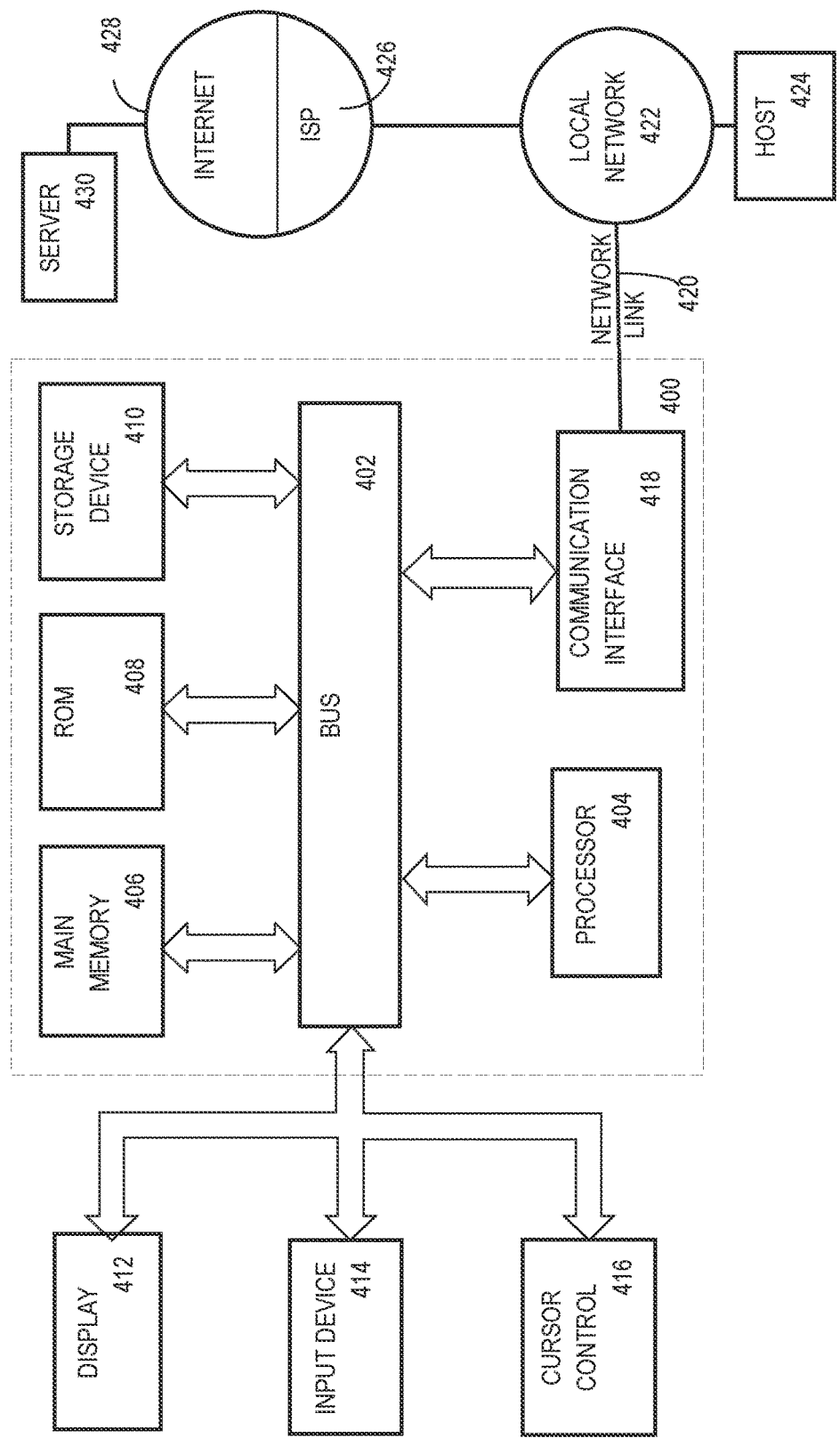
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
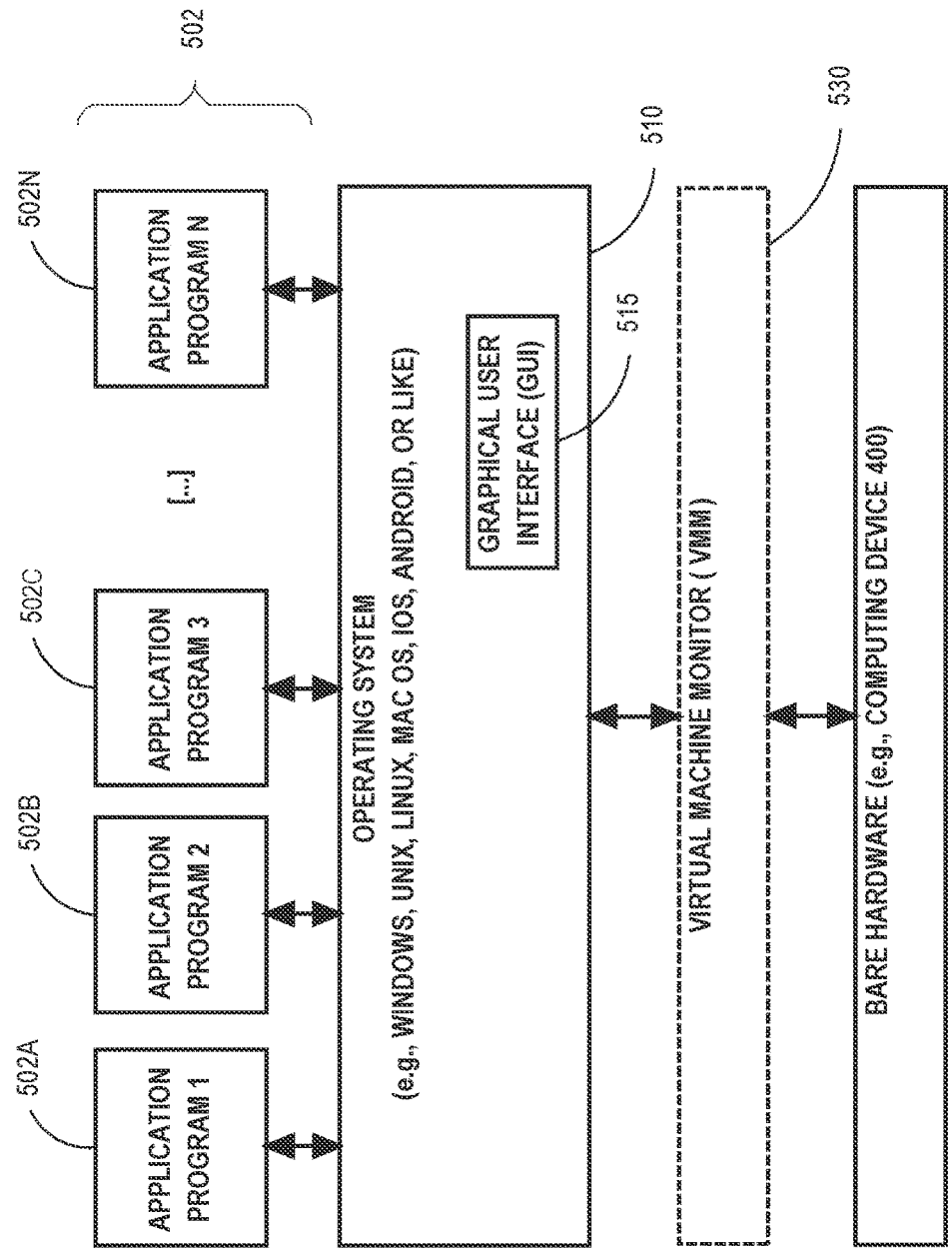
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   first requesting, from a key-value store in a random access memory (RAM) in a computer, in a first database session in a first guest language runtime environment in a polyglot database server in the computer, retrieval of first one or more rows of a plurality of rows in a relational table;
   the polyglot database server dynamically generating and invoking logic to access, in the key-value store, an array that contains a plurality of elements that are persisted in a plurality of projection columns of the relational table;
   second requesting, from said key-value store in said RAM, in a second database session in a second guest language runtime environment in the polyglot database server, retrieval of second one or more rows of the plurality of rows in the relational table; and
   accessing, by the polyglot database server, a database index of the relational table to load the plurality of rows into the key-value store in the RAM from one selected from a group consisting of the relational table and a row cache for the relational table in said RAM;
   wherein said first requesting, said second requesting, and said accessing the database index do not execute a database statement;
   wherein the method is performed by the computer.

2. The method of claim 1 further comprising third requesting, in a database transaction that contains a database statement and said first requesting, retrieval of third one or more rows of the plurality of rows in the relational table from said key-value store in said RAM.

3. The method of claim 1 further comprising allocating, to the key-value store, a database cursor.

4. The method of claim 3 further comprising in response to said second requesting:
   detecting that the database cursor is invalid, and
   reinitializing or replacing the database cursor.

5. The method of claim 4 further comprising causing the database cursor to become invalid by altering a definition of the relational table.

6. The method of claim 1 further comprising locking, without executing a database statement, a definition of the relational table for said accessing the database index to load the plurality of rows.

7. The method of claim 1 further comprising:
   generating the key-value store in the RAM from a specification that identifies: a key column of the relational table that persists keys for the key-value store and the plurality of projection columns of the relational table;
   using a lookup key to access, in the key-value store, the array.

8. The method of claim 7 further comprising the polyglot database server dynamically generating respective logic to access each element in the plurality of elements in the array in the key-value store, wherein the dynamically generating the respective logic of said each element is based on at least one selected from the group consisting of: a definition of the relational table, one or more values stored in a column of the plurality of projection columns, and a datatype of a column of the plurality of projection columns.

9. The method of claim 1 wherein:
   a row in the plurality of rows contains a plurality of fields;
   said accessing the database index to load the plurality of rows into the key-value store in the RAM comprises loading the row into the key-value store without extracting field(s) from the row;
   the first guest language runtime environment and the second guest language runtime environment in the polyglot database server do not manage a first region of the RAM that contains the key-value store;
   the method further comprises in response to said first requesting, copying a subset plurality of the plurality of fields of the row from the key-value store into a second region of the RAM that is managed by the first guest language runtime environment in the polyglot database server.

10. The method of claim 1 further comprising in response to said first requesting, without executing a database statement, performing at least one activity selected from the group consisting of: parsing the database statement, authorizing the database statement, and dynamically generating the database statement.

11. The method of claim 1 wherein the first guest language runtime environment is for a first guest language, and the second guest language runtime environment is for a second guest language.

12. One or more non-transitory computer-readable media storing instructions that, when executed by one or more processors in a computer, cause:
   first requesting, from a key-value store in a random access memory (RAM) in the computer, in a first database session in a first guest language runtime environment in a polyglot database server in the computer, retrieval of first one or more rows of a plurality of rows in a relational table;
   the polyglot database server dynamically generating and invoking logic to access, in the key-value store, an array that contains a plurality of elements that are persisted in a plurality of projection columns of the relational table;
   second requesting, from said key-value store in said RAM, in a second database session in a second guest language runtime environment in the polyglot database server, retrieval of second one or more rows of the plurality of rows in the relational table; and
   accessing, by the polyglot database server, a database index of the relational table to load the plurality of rows into the key-value store in the RAM from one selected from a group consisting of the relational table and a row cache for the relational table in said RAM;
   wherein said first requesting, said second requesting, and said accessing the database index do not execute a database statement.

13. The one or more non-transitory computer-readable media of claim 12 wherein the instructions further cause third requesting, in a database transaction that contains a database statement and said first requesting, retrieval of third one or more rows of the plurality of rows in the relational table from said key-value store in said RAM.

14. The one or more non-transitory computer-readable media of claim 12 wherein the instructions further cause allocating, to the key-value store, a database cursor.

15. The one or more non-transitory computer-readable media of claim 12 wherein the instructions further cause locking, without executing a database statement, a definition of the relational table for said accessing the database index to load the plurality of rows.

16. The one or more non-transitory computer-readable media of claim 12 wherein the instructions further cause:
   generating the key-value store in the RAM from a specification that identifies: a key column of the relational table that persists keys for the key-value store and the plurality of projection columns of the relational table;
   using a lookup key to access, in the key-value store, the array.

17. The one or more non-transitory computer-readable media of claim 16 wherein the instructions further cause the polyglot database server dynamically generating respective logic to access each element in the plurality of elements in the array in the key-value store, wherein the dynamically generating the respective logic of said each element is based on at least one selected from the group consisting of: a definition of the relational table, one or more values stored in a column of the plurality of projection columns, and a datatype of a column of the plurality of projection columns.

18. The one or more non-transitory computer-readable media of claim 12 wherein:
   a row in the plurality of rows contains a plurality of fields;
   said accessing the database index to load the plurality of rows into the key-value store in the RAM comprises loading the row into the key-value store without extracting field(s) from the row;
   the first guest language runtime environment and the second guest language runtime environment in the polyglot database server do not manage a first region of the RAM that contains the key-value store;
   the instructions further cause in response to said first requesting, copying a subset plurality of the plurality of fields of the row from the key-value store into a second region of the RAM that is managed by the first guest language runtime environment in the polyglot database server.

19. The one or more non-transitory computer-readable media of claim 12 wherein the instructions further cause in response to said first requesting, without executing a database statement, performing at least one activity selected from the group consisting of: parsing the database statement, authorizing the database statement, and dynamically generating the database statement.

20. The one or more non-transitory computer-readable media of claim 12 wherein the first guest language runtime environment is for a first guest language, and the second guest language runtime environment is for a second guest language.

21. The method of claim 1 wherein said first requesting, said second requesting, and said accessing the database index do not use relational algebra.

* * * * *